US007028683B1

(12) United States Patent
Chen

(10) Patent No.: US 7,028,683 B1
(45) Date of Patent: Apr. 18, 2006

(54) STRUCTURAL IMPROVEMENT IN A PORTABLE STONE CUTTER

(76) Inventor: Yuehting Chen, P.O. Box 697, Fongyuan City, Taichung County (TW) 420

( * ) Notice: Subject to any disclaimer, the term of this patent is extended or adjusted under 35 U.S.C. 154(b) by 0 days.

(21) Appl. No.: 10/865,843

(22) Filed: Jun. 14, 2004

(51) Int. Cl.
*B28D 1/04* (2006.01)
*B23D 19/00* (2006.01)
*B26D 1/46* (2006.01)

(52) U.S. Cl. .............................. 125/13.03; 125/13.01; 125/14; 83/473; 83/810; 83/781

(58) Field of Classification Search ............ 125/13.01, 125/13.03, 14; 83/473, 810, 781, 468.7, 83/498.3
See application file for complete search history.

(56) References Cited

U.S. PATENT DOCUMENTS 5,832,913 A * 11/1998 Arends .................... 125/13.01
6,494,198 B1 * 12/2002 Chen ....................... 125/13.01
D475,267 S * 6/2003 Bradfield et al. ........ 125/13.01

* cited by examiner

*Primary Examiner*—Joseph J. Hail, III
*Assistant Examiner*—Bryan Muller

(57) ABSTRACT

A structural improvement in a portable stone cutter includes a box like rectangular base being separated in the center by a partition into a water sink and motor compartment abutting a plain surface, to which a switch and piece of electric wire are disposed. The motor has an axis inserted into the water sink via a through hole in the partition and connected with a saw blade which is partially submerged in the water. A rectangular lid covering the top of the base includes a plate on the left side having a pair of stepped stopping surfaces spacedly formed on the top and an opening on the right side on the top of the water sink. A pair of first and second grille working plates respectively pivot to the middle and the right edge of the lid so that the working plates are capable of lifting and forming a certain angle relative to the plane surface of the lid. A dividing device together with a leant upon ruler slidably secured to the front and rear edge of the lid and a blade guide pivoted to a support plate on the top of the saw blade.

3 Claims, 10 Drawing Sheets

STRUCTURAL IMPROVEMENT IN A PORTABLE STONE CUTTER

BACKGROUND OF THE INVENTION

The present invention relates to cutters and more particularly to a structural improvement in a portable stone cutter.

A portable stone cutter is designed around nimbleness and convenience. But this type of stone cutter is usually limited to its functions due to that there is no much space to stall other necessary elements such as the precised rulers which are separately carried by the operator.

Further, a stone cutter has to have a water sink to cool down the saw blade and to accept sawdust during the operations and a space sufficient to store a motor which operates the saw blade and is completely separated from the water sink. So the motor compartment in the stone cutter is always sealed up by a lid and adhesives in order to prevent the water in the water sink from moistening the motor. Whereas, if the motor is moistened by the water, it maybe damaged. Thus, the operator has to remove the lid at first. Then takes the motor out of the compartment for repairing, causing great inconvenience to the operator.

SUMMARY OF THE PRESENT INVENTION

The present invention has a main object to provide a structural improvement in a portable stone cutter in which the motor is completely separated from water and readily to disassemble for maintenance and the electric wire is collected into the cutter when not in use.

Another object of the present invention is to provide a structural improvement in a portable stone cutter in which has a dividing device to precisely adjust the cutting angle of the working piece.

Still another object of the present invention is to provide a structural improvement in a portable stone cutter in which a dividing plate is provided to facilitate the operator to measure varied cutting angles for the working piece.

Further object of the present invention is to provide a structural improvement in a portable stone cutter in which a leant upon ruler is provided to facilitate the working piece to lean upon during the cutting operation so as to ensure that the results are uniform and neat.

Further object of the present invention is to provide a structural improvement in a portable stone cutter in which the leant up ruler and the electric wire are collected at to the bottom when the stone cutter is not in use.

Accordingly, the structural improvement in a portable stone cutter of the present invention comprises generally a box like rectangular base which is separated by a partition into a water sink and motor compartment. The motor has an axis inserted through the partition to connect with a saw blade with a swinging ring and a sealing ring engaged therebetween. A receiving space and a pair of grip plates respectively collect and grip the electric wires and a leant upon ruler.

A rectangular lid covers the top of the base and has an opening in the right side engaged with the water sink and a plate on the left side to protect the motor having a pair of stepped concaves in the top for engaging with the leant up ruler.

A pair of grille working plates disposed on the top of the lid, wherein the right side working plate is pivoted to the right edge of the lid and the left working plate is pivoted to the middle of the lid so that each of the working plates are capable of lifting different angles. A blade guide disposes on the top of the saw blade and a dividing device which is composed of a dividing plate and a V-shaped ruler clamps the top of the leant upon ruler. So that a compact stone cutter possess a varied functions enabling to cut the working pieces into different shaped results.

The present invention will become more fully understood by reference to the following detailed description thereof when read in conjunction with the attached drawings.

DETAILED DESCRIPTION OF THE PREFERRED EMBODIMENT

Figure 1:
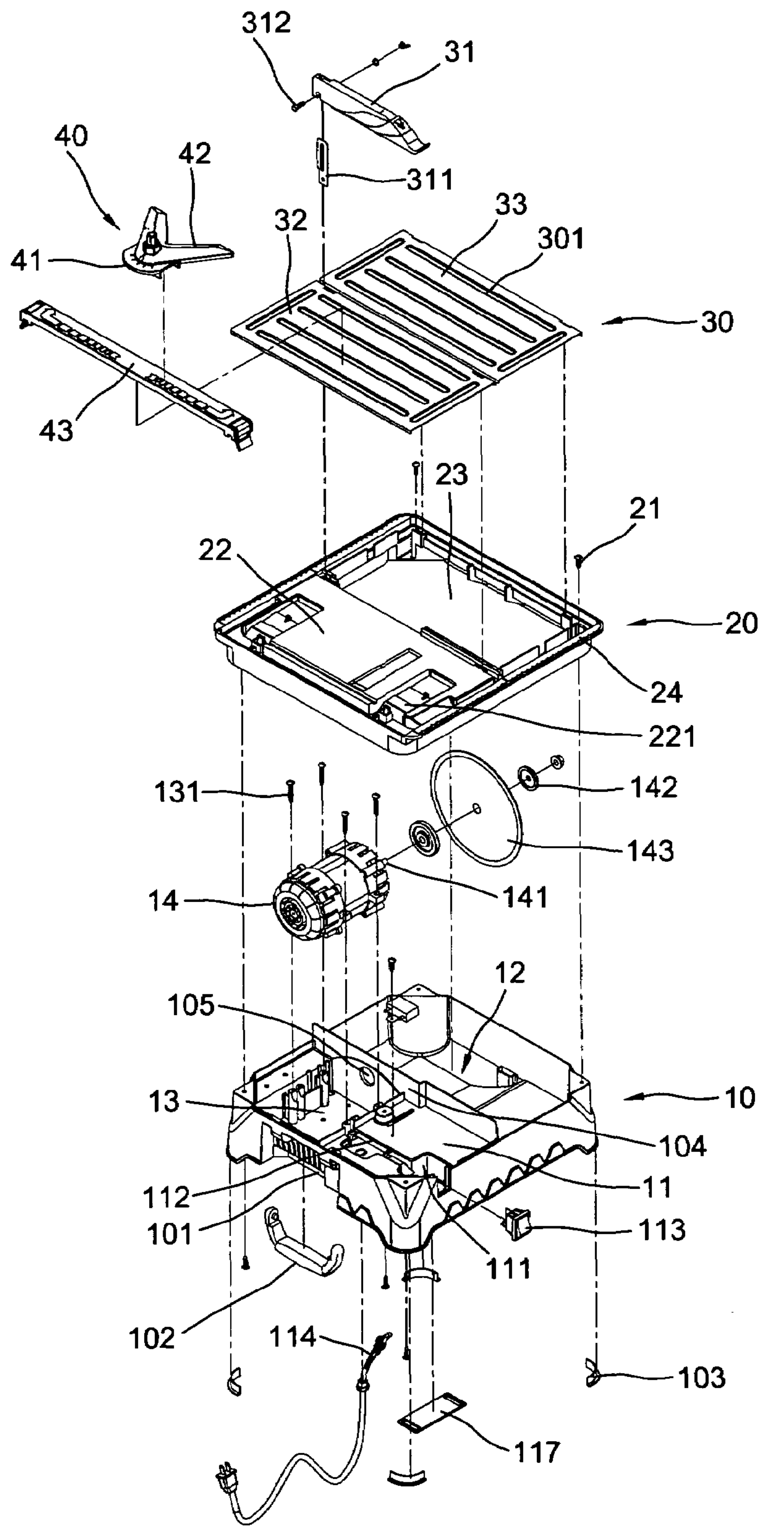
FIG. 1 is an exploded perspective view to show the preferred embodiment of the stone cutter of the present invention.
Figure 2:
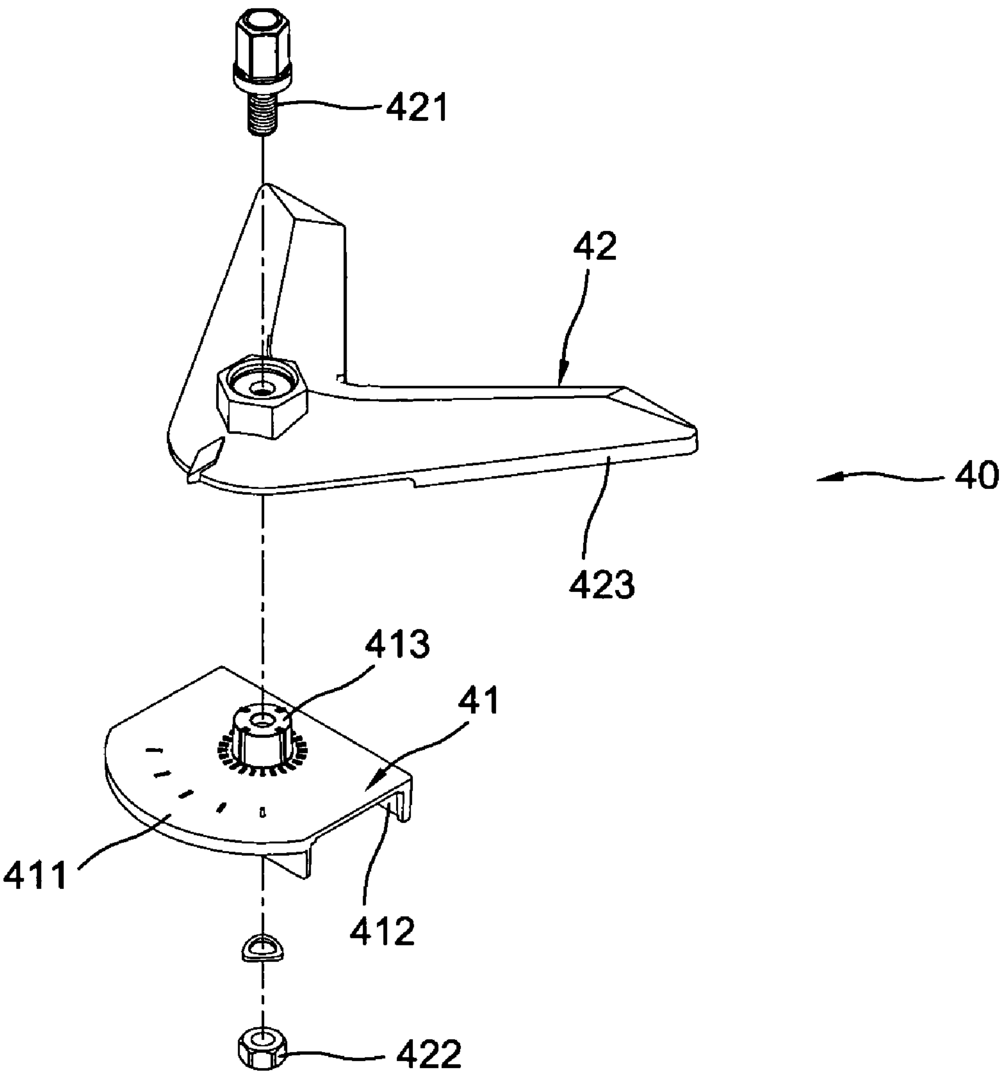
FIG. 2 is an exploded perspective view of a dividing device of the present invention.
Figure 3:
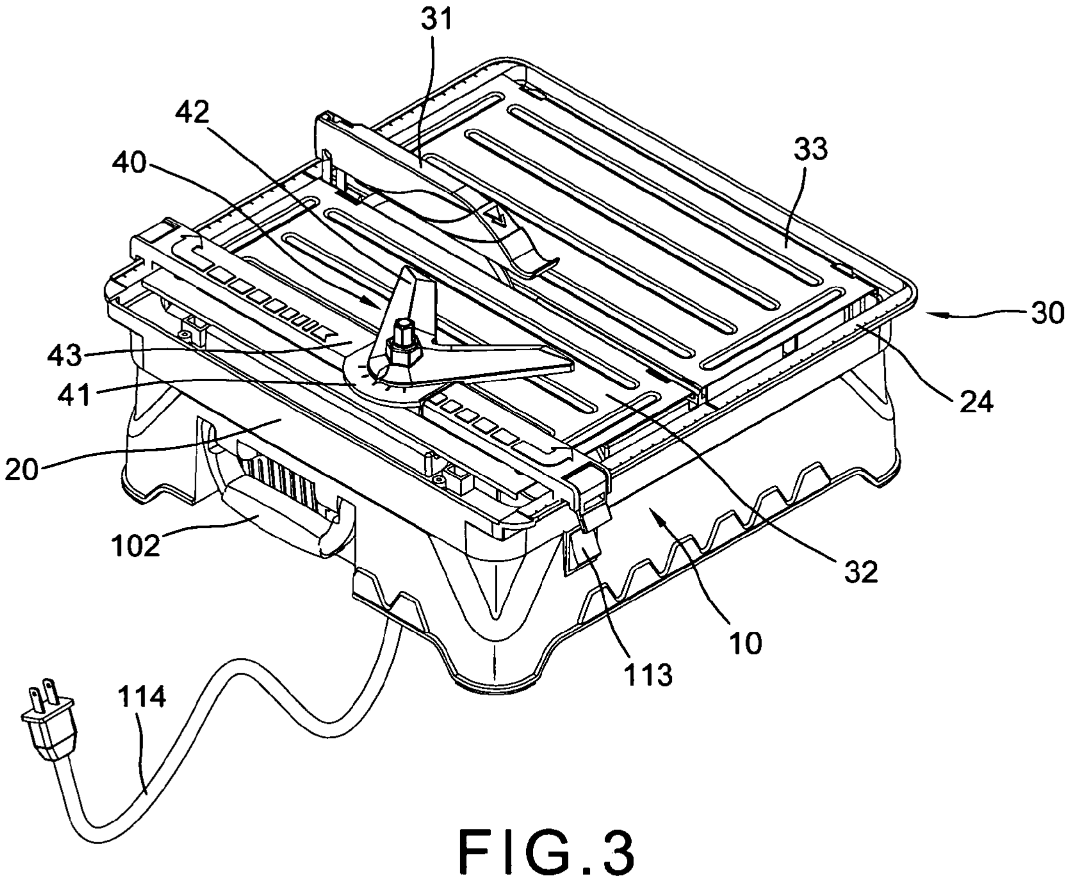
FIG. 3 is a perspective view to show the assembly of FIG. 1.

With reference to FIGS. 1, 2 and 3 of the drawings, the structural improvement in a portable stone cutter of the present invention comprises generally a box like rectangular base 10, a rectangular lid 20, a pair of grille working plates 30, a blade guide 31 and a dividing device 40.

Figure 7:
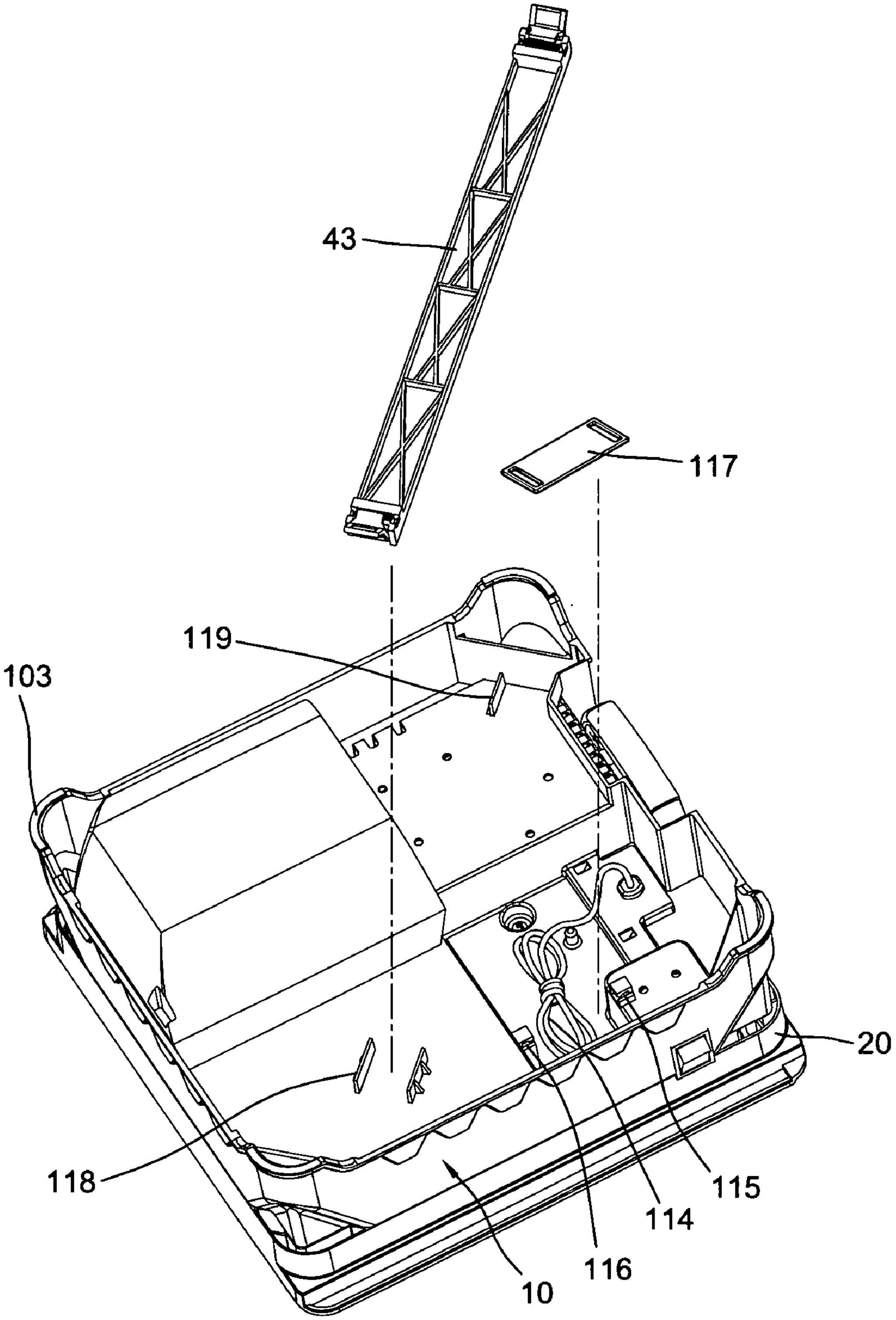
FIG. 7 is a perspective view to show the elements in the bottom of the stone cutter.
Figure 8:
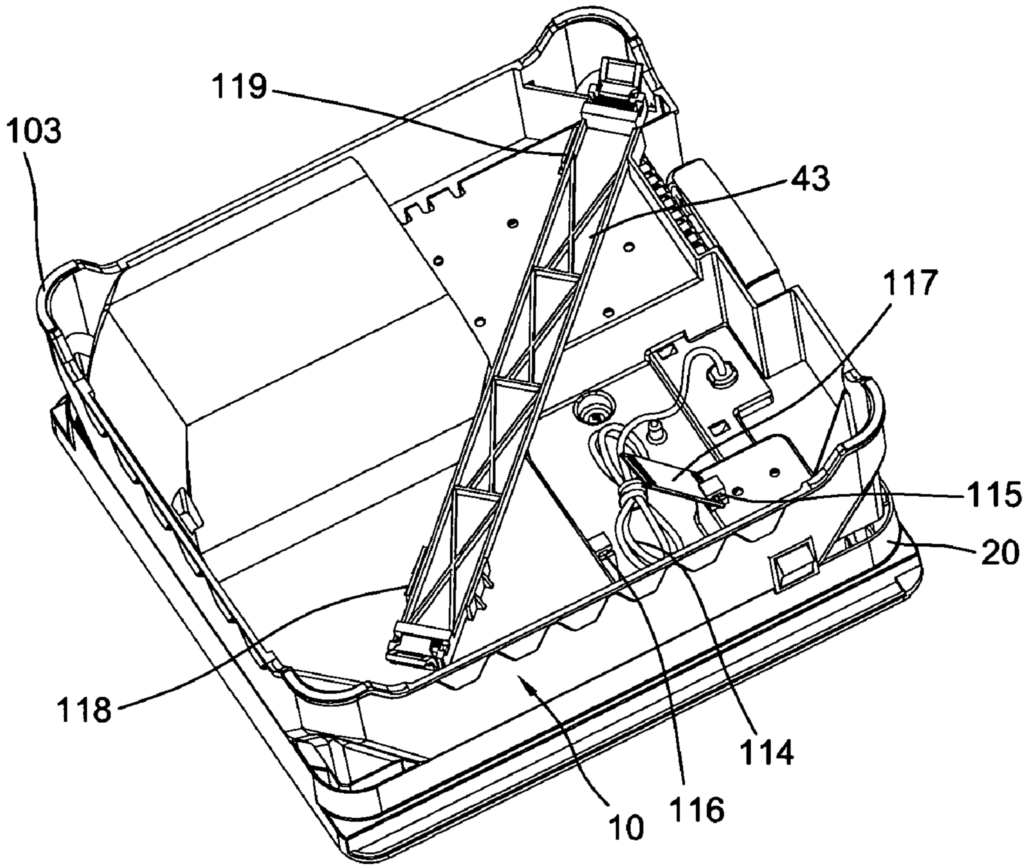
FIG. 8 is a perspective view to that the leant upon ruler is clamped by pair of grip plates and retaining plate is engaging with a pair of detents.
Figure 9:
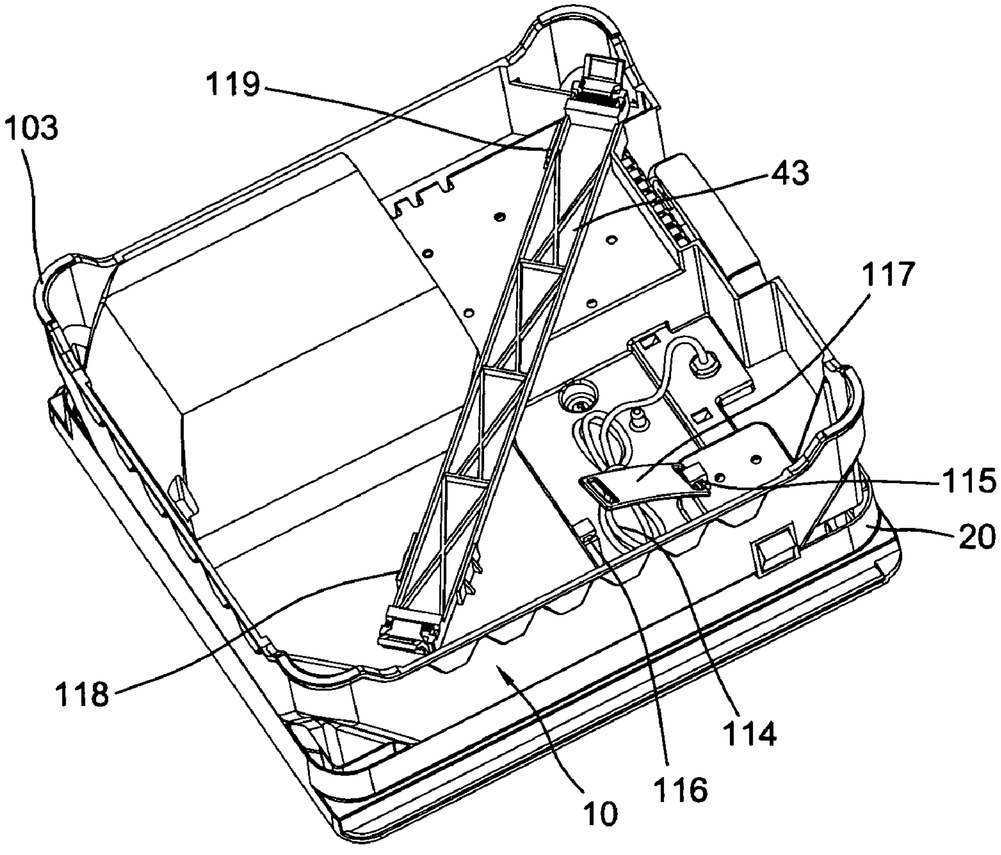
FIG. 9 is a perspective view to show that the retaining plate is flexible.
Figure 10:
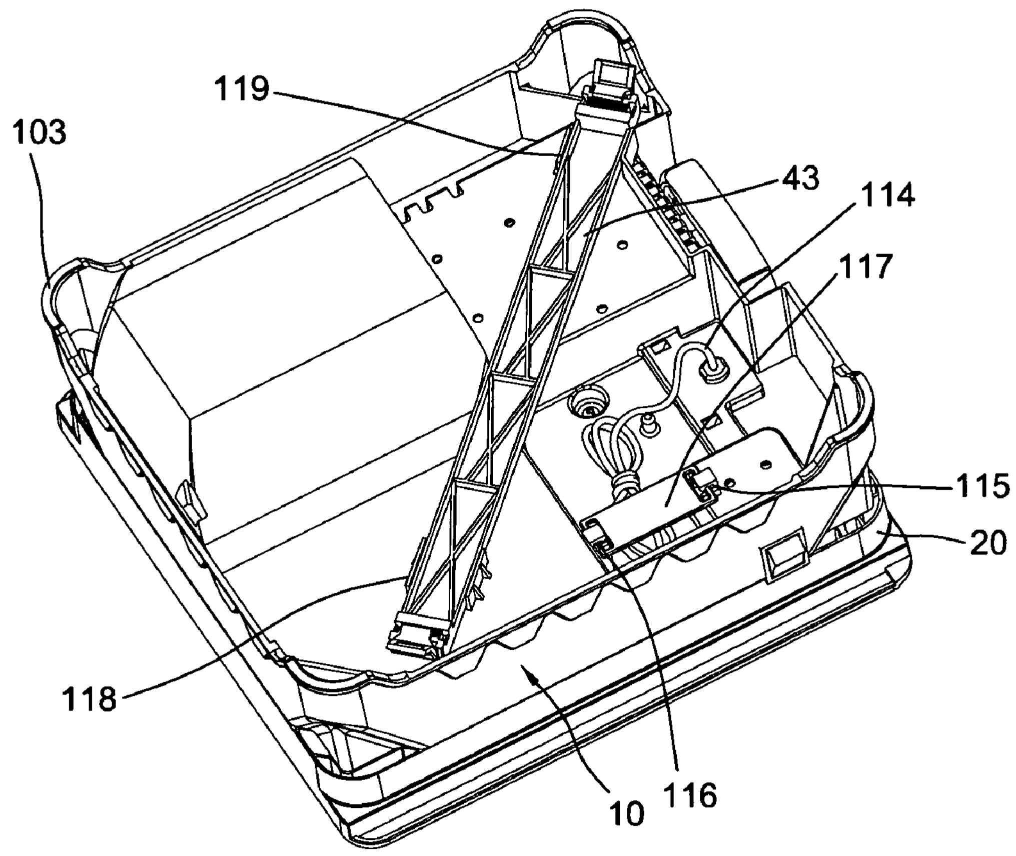
FIG. 10 is a perspective view to show that both the leant upon ruler and the retaining plate are fixed to the bottom of the stone cutter where an electric wire is fixed by the retaining plate.

The box like rectangular base 10 is separated by a partition into a water sink 12 and a motor compartment 13 and a high plain surface 11 which has a pair of indentations 111 and 112 for respectively engaging a switch 113 and a piece of electric wire 114, wherein the motor 14 is secured in the motor compartment 13 by a plurality of screws 131 and has an axis 141 on front end inserted into the water sink 12 via a through hole 105 in the partition 104 and perpendicularly connected to a saw blade 143 with a sealing ring and a swinging ring 142 engaged therebetween for preventing the water in the sink 12 from entering into the motor compartment 13, a concave 101 in a side wall thereof for pivoting a handle 102 therein and a foot pad 103 fixed to each of the lower corners of the base 10 in the bottom of which there is a pair of U-shaped detent 115 and 116 having narrow outlet in, a depressed portion which is the opposite side of the plain surface 11 (as shown in FIG. 7) for inlaid a retaining plate 117 which is provided to fix the electric wire 114 (as shown in FIGS. 1 and 8) a pair of elastic grip plates 118 and 119 diagonally arranged on the bottom for pressedly engaging two ends of a leant upon ruler 43 therein when the stone cutter is not in use.

The rectangular lid 20 covers the top of the base 10 and fixed by screws 21 and has a closed left side 22 including a pair of stepped stopping surfaces 221 spacedly formed in two ends respectively, an opened right side 23 on the top of the water sink 12 and the graduations 24 on the front and the rear edges.

Figure 6:
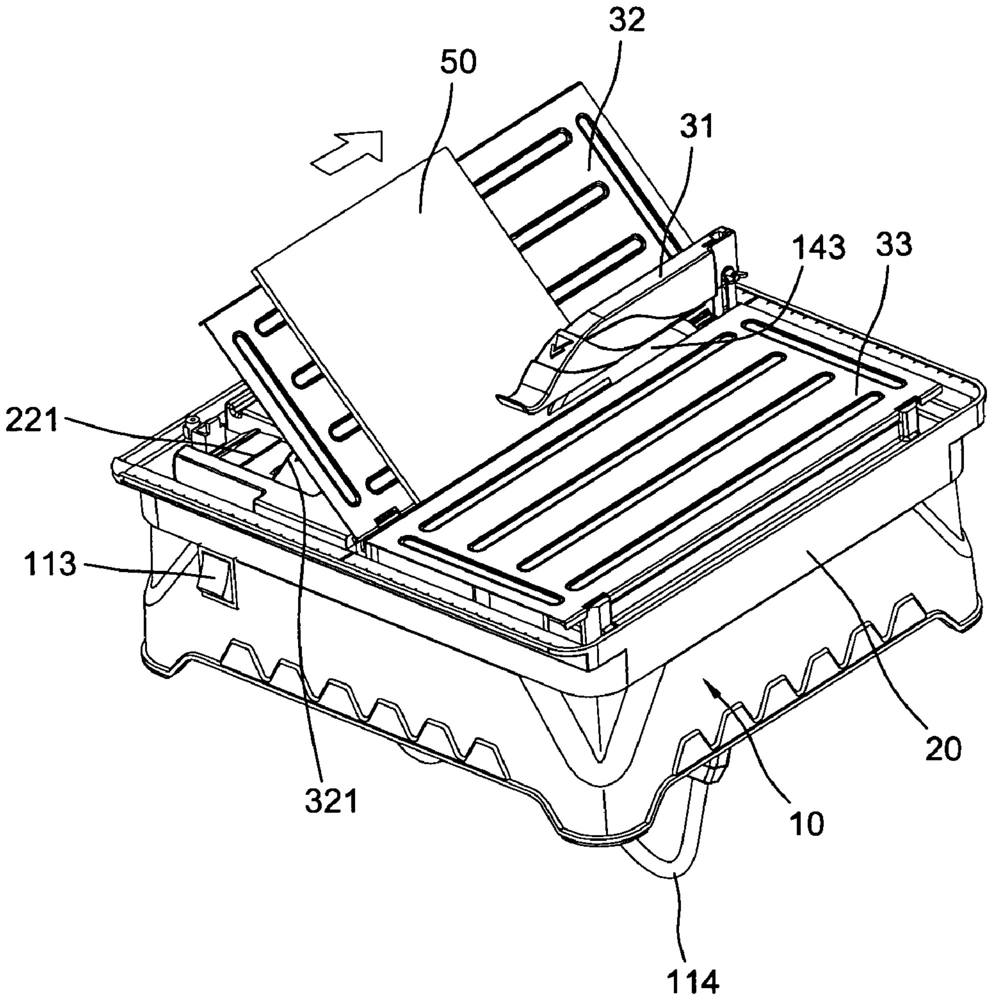
FIG. 6 is a perspective view to show that the leftside portion of the working table is lifted a certain angle during cutting a working piece.

The pair of grille working plates 30 are rotatable secured to the top of the lid 20 and each has a plurality of longitudinal slits 301 spacedly formed in the body, wherein the left side working plate 32 is pivoted to the middle portion of the lid 20 and the right side working plate 33 is pivoted to the right edge of the lid 20 so that both the left and the right working plates 32 and 33 are able to lift up for a certain angle relative to the plane surface of the lid 20. The left side grille working plate 32 has a pair of supports 321 pivoted to the underside and selectively stopped against a step of the pair of the stepped stopping surfaces 221 on the lid 20 (as shown in FIG. 6). A support plate 311 disposes to the inner side of the front edge of the lid 20 protruded to the top of the working plates 32 and 33 via the central gap between the plates 32 and 33 for rotatably and adjustably connecting one end of the blade guide 31 by screws 312. The leant upon ruler 43 has an elastic vertical piece under each end slidably clipped on the front and rear edges of the lid 20 (as shown in FIG. 3).

The dividing device 40 is composed of a dividing plate 41 and a V-shaped ruler 42. The dividing plate 41 has graduations 411 on an arucate side, a pair of vertical gripping flanges 412 on underside which are provided to enable the dividing device 40 slidably engaged with the top of the leant upon ruler 43, a pivot 413 on the central top thereof. The V-shaped ruler 42 has a surrounded screw hole in the junction engaged with the pivot 413 of the dividing plate 41 and releasable fastened by a bolt 421 and a nut 422. The V-shaped ruler 42 further has a downward flange 423 on outer edge for pushing the working piece during the cutting operation.

Figure 5:
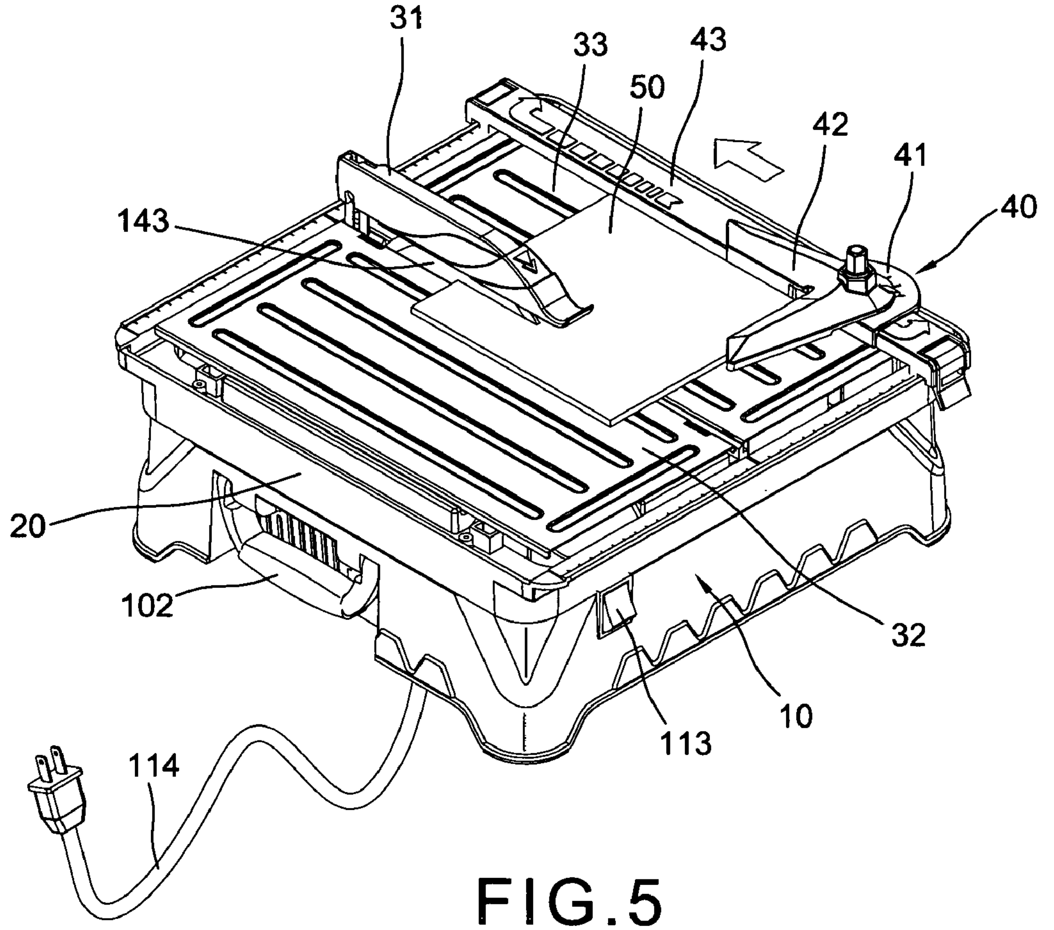
FIG. 5 is a perspective view to show the application of a leant upon ruler and the index.

Before operation, slide the leant upon ruler 43 on the top of the working plates 32 and 33 until that a desired position. Then fix two end of the ruler 43 to the front and rear edges of the lid 20 (as shown in FIGS. 3 and 5) and then slidably grip the dividing device 40 on the top of the leant upon ruler 43. The direction of the V-shaped ruler 42 is also adjustable by unfastening and fastening the bolt 421 to contact an inclined cutting of the working pieces 50.

Figure 4:
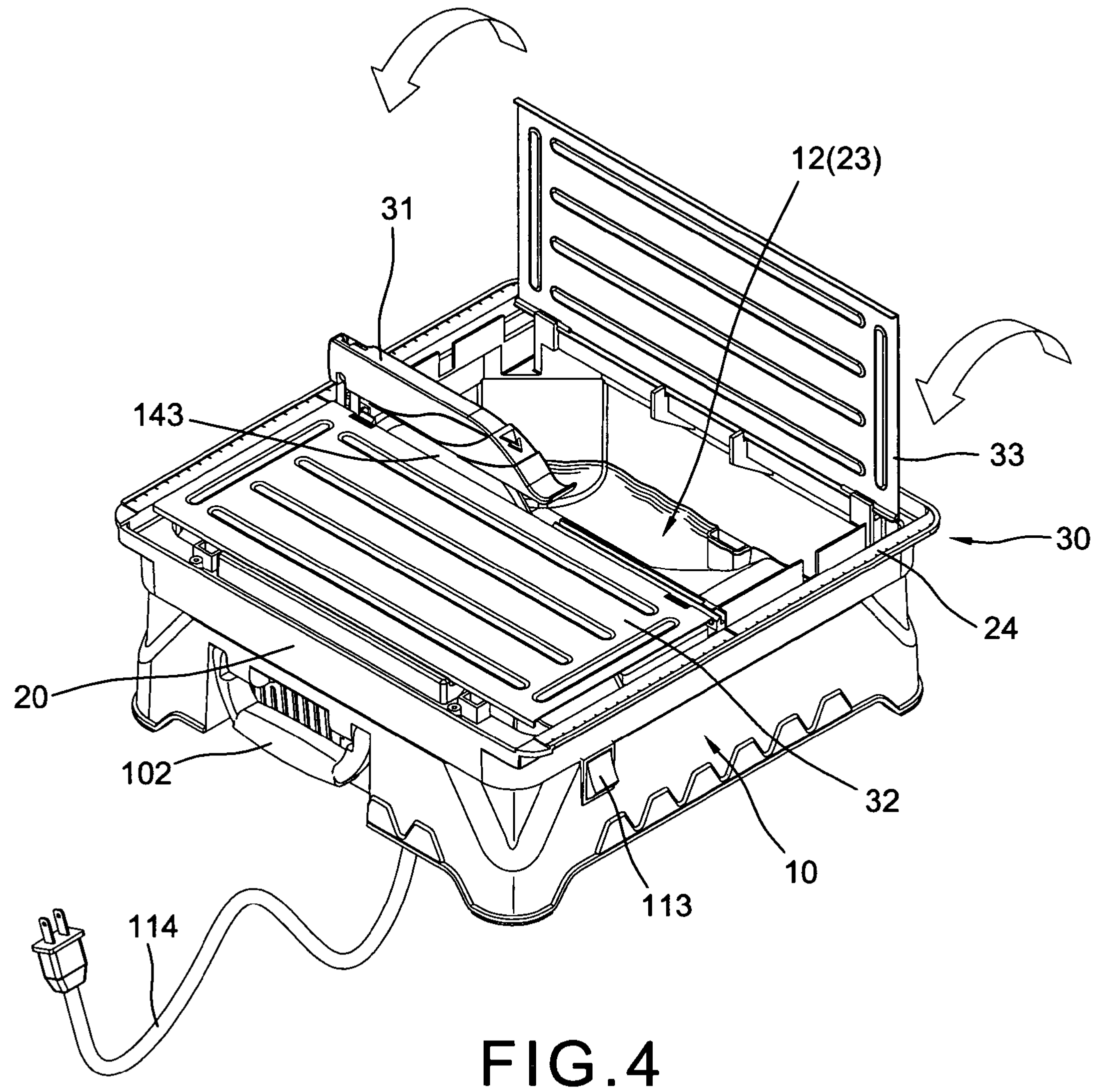
FIG. 4 is a perspective view to show the right side portion of the working table which is openable.

FIG. 4 shows that the right grille working plate 33 is lifted up in order to change the water in the water sink 12. FIG. 6 shows that the left grille working plate 32 is lifted up a certain angle relative to the plane surface of the lid 20 and is sustained by a pair of supports 321 which is stopped against a selected step of the stopping surfaces 221 to facilitate a sloped cutting of the working piece 50 into a slant edge.

Referring to FIGS. 7, 8, 9 and 10, when the job is finished, the components are put in order by removing the retaining plate 117 from detents 115 and 116 at first and engaging the retaining plate 117 into the detents 115 and 116 after the electric wire 114 is rolled up so that the electric wire 114 is held in place by the retaining plate 117. Then, removing the leant upon ruler 43 from the edges of the lid 20 and engaging it into the pair of grip plates 118 and 119 to prepare the stone cutter of the present invention to be transported.

Although, the stone cutter of the present invention is of compact volume and is portable, and it has multiple functions such as the inclined cutting, the regular cutting and the sloped cutting, etc., Also, the sawdust is all received into that water sink 12 and the dirty water is readily change and the water would not penetrate into the motor compartment 13. Further, the components thereof are readily to assembled and/or diassembled that is rather superior to the prior art, portable stone cutters.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A structural improvement in a portable stone cutter comprising:

a box like rectangular base having an opened top, a closed bottom, four side walls, a partition in center thereof to define said base into a water sink, a motor compartment abutting a high plain surface which has a pair of indentations for respectively engaging a switch and a piece of electric wire, a motor disposed in said motor compartment and secured by screws and having an axis on front end inserted into said water sink via a through hole in said partition and perpendicularly connected with a saw blade with a seal ring and a swinging ring engaged therebetween, a concave in a sidewall for pivoting a handle therein, four foot pads secured respectively to four lower corners, a pair of U-shaped detents in a depression of said bottom opposite to said plain surface for engaging two ends of a flexible plate for fixing said electric wire when it is rolled up and a pair of elastic grip plates diagonally arranged on said bottom for pressedly engaging two ends of a leant upon ruler therein;

a rectangular lid covering said opened top of said base and fixed by screws having a closed left side on top of said motor, a pair of stepped stopping surfaces spacedly formed on said closed left side and an opened right on top of said water sink and graduation being engraved on front and rear edges;

a pair of grille working plates openably disposed on top of said lid each having a plurality of longitudinal slits spacedly formed, wherein one of the grille working plates pivoted to right edge of said lid and the other pivoted to middle of the front and rear edges of said lid and having a pair of supports pivoted to an underside and stopped against one of the steps of said stepped stopping surfaces, a support plate vertically secured to an inner side of the front edge of said lid and extended upward from a central gap between said pair of grille working plates having a top pivoted with one end of a blade guide which protects a protruding portion of said saw blade;

a dividing device composed of a dividing plate having graduations on an arcuate side, a pair of vertical gripping flanges on an underside slidably engageable with said leant upon ruler and a pivot on a central top, and a V-shaped ruler having a downward flange on outer edge and a surrounded screw hole in a junction engaged with the pivot of said dividing plate secured by a bolt and a nut;

whereby, said stone cutter may conduct a regular cutting, an inclined cutting and a stopped cutting of a working piece.

2. The structural improvement as recited in claim 1, wherein said leant upon ruler has an elastic grip plate at each end capable of slidably engaging with front and rear edges of said lid.

3. The structure improvement as recited in claim 1, wherein said elastic grip plates has a narrow outlet.

* * * * *